(12) United States Patent
Costello et al.

(10) Patent No.: US 6,628,856 B1
(45) Date of Patent: Sep. 30, 2003

(54) OPTICAL SWITCH

(75) Inventors: Benedict J. Costello, Berkeley, CA (US); Peter T. Jones, Albany, CA (US); Ho-Shang Lee, El Sobrante, CA (US)

(73) Assignee: Dicon Fiberoptics, Inc., Richmond, CA (US)

( * ) Notice: Subject to any disclaimer, the term of this patent is extended or adjusted under 35 U.S.C. 154(b) by 16 days.

(21) Appl. No.: 09/671,377

(22) Filed: Sep. 27, 2000

(51) Int. Cl.⁷ .............................. G02B 6/26; G02B 6/42
(52) U.S. Cl. ........................................................ 385/18
(58) Field of Search ..................................... 385/18, 16

(56) References Cited

U.S. PATENT DOCUMENTS

| | | | |
|---|---|---|---|
| 4,317,611 A | 3/1982 | Petersen | |
| 5,024,500 A | 6/1991 | Stanley et al. | |
| 5,629,790 A | 5/1997 | Neukermans et al. | |
| 5,684,631 A | * 11/1997 | Greywall | 385/18 |
| 5,742,712 A | * 4/1998 | Pan et al. | 385/16 |
| 5,748,812 A | * 5/1998 | Buchin | 385/18 |
| 5,774,604 A | * 6/1998 | McDonald | 385/18 |
| 5,867,617 A | * 2/1999 | Pan et al. | 385/16 |
| 5,914,801 A | 6/1999 | Dhuler et al. | |
| 5,974,207 A | 10/1999 | Aksyuk et al. | |
| 6,025,951 A | 2/2000 | Swart et al. | |
| 6,028,689 A | * 2/2000 | Michalicek et al. | 359/223 |
| 6,031,946 A | 2/2000 | Bergmann et al. | |
| 6,044,705 A | 4/2000 | Neukermans et al. | |
| 6,097,860 A | 8/2000 | Laor | |
| 6,195,479 B1 | * 2/2001 | Pan | 359/281 |
| 6,229,640 B1 | * 5/2001 | Zhang | 359/223 |
| 6,275,626 B1 | * 8/2001 | Laor | 385/16 |
| 6,353,692 B1 | * 3/2002 | Colbourne | 385/16 |

OTHER PUBLICATIONS

"Wavelength Add–Drop Switching Using Tilting Micromirrors," J. E. Ford et al., *Jounral of Lightwave Technology*, vol. 17, No. 5, May 1999, pp. 904–910.

* cited by examiner

*Primary Examiner*—Lynn Feild
*Assistant Examiner*—Brian S. Webb
(74) *Attorney, Agent, or Firm*—Parsons, Hsue & de Runtz LLP

(57) ABSTRACT

The optical switch includes input optical fibers, output optical fibers, a lens, a movable mirror, and an actuator operative to move the mirror. Depending on a voltage applied to the actuator, the actuator selectively set the mirror to a first position corresponding to a first combination of optical paths, through which the light beam travels from the first set of the input optical fibers to the second set of the output optical fibers; and to a second position corresponding to a second combination of optical paths, through which the light beam travels from the first set to the second set. The first combination is different from the second combination, and a number of optical fibers of the first set and the second set is more than two.

17 Claims, 15 Drawing Sheets

OPTICAL SWITCH

BACKGROUND OF THE INVENTION

This invention relates in general to an optical switch. More specifically, the invention relates to an optical switch which has two inputs and two outputs.

In fiber optic communications and other optical applications, optical switches are used to selectively reroute signals. There have been many devices which function as optical switches. However, in order to apply those devices in harsh environments, there is a strong need in the art for an optical switch which functions with operational stability and mechanical durability. In addition, there is a need in the art for an optical switch which is compact in size and easy to manufacture.

SUMMARY OF THE INVENTION

The present invention is directed to an optical switch which includes a first set of one or more input optical fibers which send a light beam; a second set of one or more output optical fibers which receive the light beam; a lens which focuses the light beam; a movable mirror which reflects the light beam from the first set onto the second set of output optical fibers; and an actuator operative to move the mirror. The actuator selectively sets the mirror to a first position corresponding to a first combination of optical paths, through which the light beam travels from the first set to the second set, and to a second position corresponding to a second combination of optical paths, through which the light beam travels from the first set to the second set. According to the present invention, the first combination is different from the second combination, and a number of optical fibers of the first set and the second set is more than two.

In one embodiment of the present invention, the optical switch includes a ferrule which supports the first set and the second set; a package encasing the mirror and the actuator; and a window which is made of transparent material and provided on the package. The lens is a gradient index lens, and is sandwiched by the ferrule and the window.

In another embodiment of the present invention, the number of optical fibers of the second set is two.

In another embodiment, loss between the first set and the second set when the mirror is in a first position is different from loss between the first set and the second set when the mirror is in a second position.

In another embodiment, the first set has a first input optical fiber and a second input optical fiber, and the second set has a first output optical fiber and a second output optical fiber; and the first combination includes a first optical path between the first input optical fiber and the first output optical fiber, and a second optical path between the second input optical fiber and the second output optical fiber, and the second combination includes a third optical path between the first input optical fiber and the second output optical fiber, and the second input optical fiber is decoupled from the first and second output optical fibers.

In another embodiment, the first set has a first input optical fiber and a second input optical fiber, and the second set has a first output optical fiber and a second output optical fiber; and the first combination includes a first optical path between the first input optical fiber and the first output optical fiber, and a second optical path between the second input optical fiber and the second output optical fiber, and the second combination includes a third optical path between the first input optical fiber and the second output optical fiber, and a fourth optical path between the second input optical fiber and the first output optical fiber.

In another embodiment, the actuator moves the mirror by electrostatic force.

In another embodiment, the mirror and the actuator are provided on a silicon wafer.

In another embodiment, the actuator includes a plurality of interdigitated fingers.

In another embodiment, a direction of the electrostatic force is normal to a plane of the silicon wafer.

In another embodiment, the optical switch further includes a ferrule which supports the first set and the second set.

In another embodiment, the optical switch further includes a package encasing the mirror and the actuator.

In another embodiment, the package has a window which is made of transparent material.

In another embodiment, the lens is a gradient index lens, and is connected to the ferrule, and is attached to the window.

DETAILED DESCRIPTION OF THE PREFFERED EMBODIMENTS

The present invention will now be described in detail with reference to the drawings, wherein like elements are referred to with like reference labels throughout.

The optical switch and the optical attenuator according to the present invention preferably include a microfabricated mirror to direct light from one or more input optical fibers to one or more output optical fibers. When the present invention functions as an optical switch, a mirror is tilted by an electronic control signal to redirect the light beam to alternate output fibers. When the present invention functions as an optical attenuator, the mirror is tilted to redirect the light beam gradually away from the output fiber, thus attenuating the output signal power.

Figure 1:
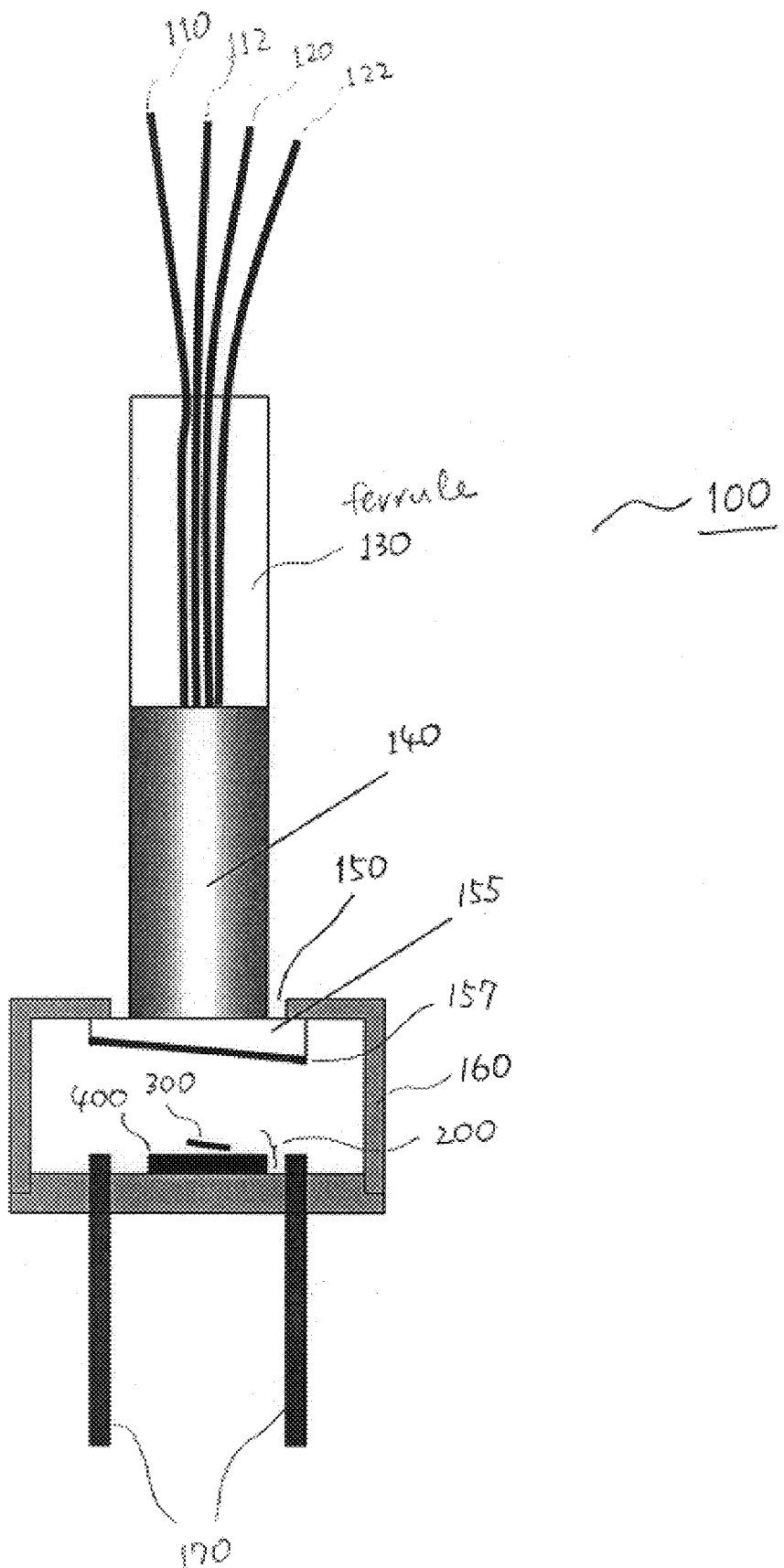
FIG. 1 is a cross-sectional view of one embodiment of the optical switch according to the present invention.

FIG. 1 illustrates a cross-section view of a first embodiment of an optical switch 100 according to the present invention. The optical switch 100 functions as a switch or an attenuator as described below. The optical switch 100 includes input optical fibers 110 and 112, output optical fibers 120 and 122, a lens 140, and a mirror 300. The input optical fibers 110 and 112 send a light beam from an external device coupled to the optical switch 100 to the mirror 300 through the lens 140. The mirror 300 reflects the light beam from the input optical fibers 110 and 112 onto the output optical fibers 120 and 122. The output optical fibers 120 and 122 send the reflected light beam to another external device coupled to the optical switch 100.

The number of the input optical fibers 110 and 112 is two here, but the number may be one, or more than two. Also, the number of the output optical fibers 120 and 122 is two here, but the number may be one, or more than two. As long as the total number of the input optical fibers and the output optical fibers is more than two, the present invention provides an optical switch capable of selecting one of the input fibers at which the light beam is received, or selecting one of the output fibers from which the light beam is sent.

A ferrule 130 supports the input optical fibers 110 and 112, and the output optical fibers 120 and 122 relative to one another, and relative to the lens 140. The ferrule 130 is made of glass or silicon. The ferrule 130 supports the input optical fibers 110 and 112, and the output optical fibers 120 and 122 in a predetermined pattern described below referring to FIGS. 12 and 13.

The mirror 300 is manufactured preferably on a part of a wafer 400, and is movably supported on the wafer 400. The wafer 400 is preferably made of silicon. A mirror chip 200 includes the mirror 300, the wafer 400, and an actuator, which is not shown in FIG. 1, but will be described in detail referring to FIGS. 14–21, for moving the mirror 300 in response to a control signal applied to leads 170.

A package 160 encases and seals the mirror chip 200 in order to prevent dirt or moisture from impairing its operation. The package 160 has an opening 150 through which the light beam passes. A window 155 is made of a transparent material, such as glass.

The window 155 is provided on the opening 150 inside the package 160. The window 155 preferably has an antireflective coating 157 on the side facing the chip 200. The window 155 preferably has a wedge cross-section as shown in FIG. 1 in order to prevent an etalon caused by the two faces of the window 155. The package 160 is preferably a TO-type package, which is a cylindrical metal can with the parallel leads 170 extending from the bottom surface of the package 160.

One end of the lens 140 is attached to the ends of the co-terminus input and output optical fibers 110, 112, 120 and 122. Another end of the lens 140 is attached to the surface of the window 155 which does not have the coating 157, and is flush with the inside wall of the package 160. As a result, the light beam travels in one or more of the input optical fibers 110 and 112, is collimated by the lens 140, and reflects off the mirror 300. The reflected light beam is focused by the lens 140 onto one or more of the output optical fibers 120 and 122. The lens 140 is preferably a GRIN (gradient index) lens, and is sandwiched by the ferrule 130, and the surface of the window 155 which does not have the coating 157 and flush with the inside wall of the package 160.

The structure illustrated in FIG. 1 of the ferrule 130 supporting the input and output optical fibers 110, 112, 120 and 122; the lens 140; and the package 160 containing the mirror chip 200 provides an optical switch which is compact in size and durable without being affected by variations in the external environment.

Figure 2:
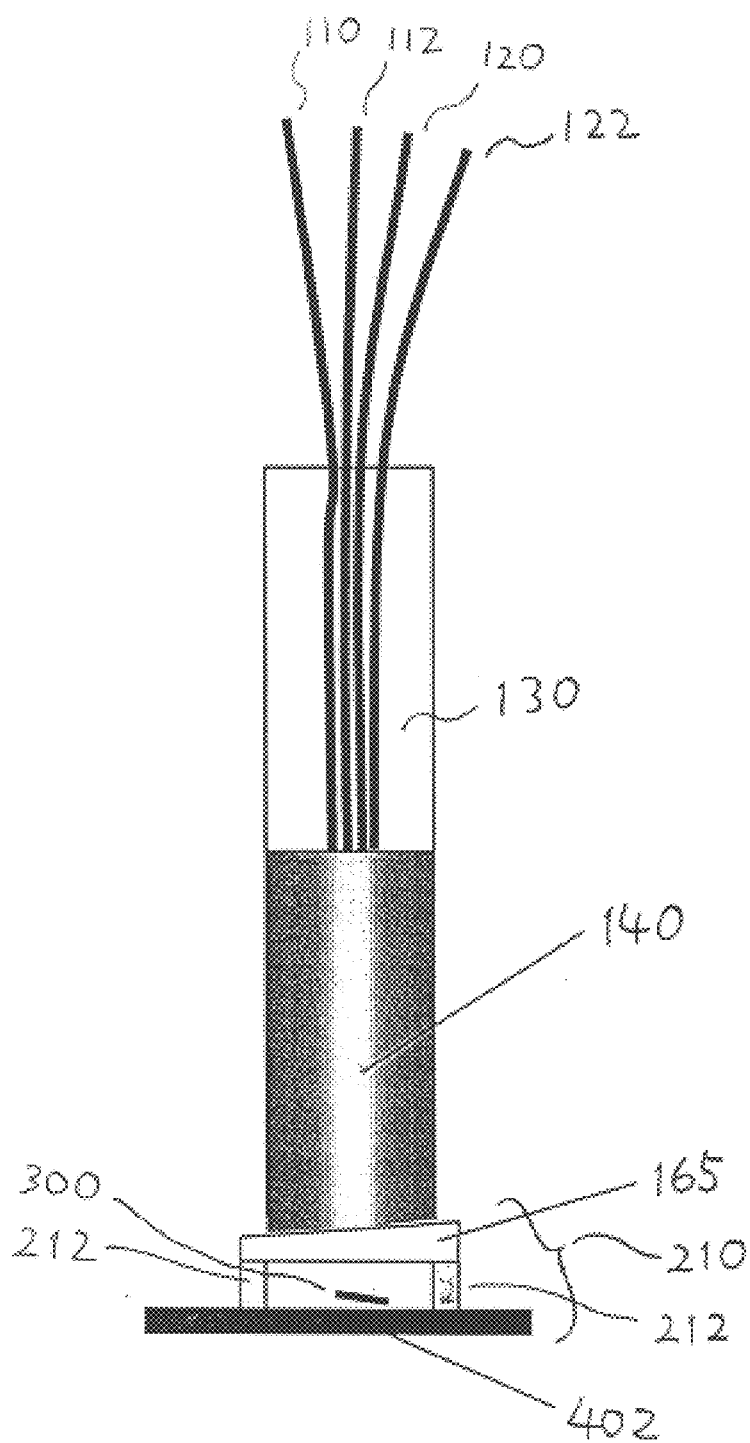
FIG. 2 is a cross-sectional view of another embodiment of the optical switch according to the present invention.

FIG. 2 represents another embodiment of the optical switch according to the present invention. As an alternative to the package 160, a mirror chip 210 which is a chip-scale package is utilized. The mirror chip 210 includes a wafer 402 on which the mirror 300 is manufactured, a mirror 165, and bonding supports 212. The window 165 forms an upper half of the mirror chip 210, on which the lens 140 is attached. The wafer 402 forms a lower half of the mirror chip 210. The window 165, which functions in the same manner as the window 155, is bonded directly on the wafer 402 using the bonding supports 212. The bonding supports 212 are made preferably from one of gold, glass frit, and epoxy.

In the embodiments shown in FIGS. 1 and 2, the lens 140 is bonded directly to the windows 155 and 165, respectively. The two arrangements of the embodiments illustrated in FIGS. 1 and 2 forms a compact assembly that is stable to variations due to changes in the ambient conditions, such as temperature, humidity, and mechanical stress or vibration. Thus, according to the present invention, a reliable and compact optical switch is realized.

Figure 3:
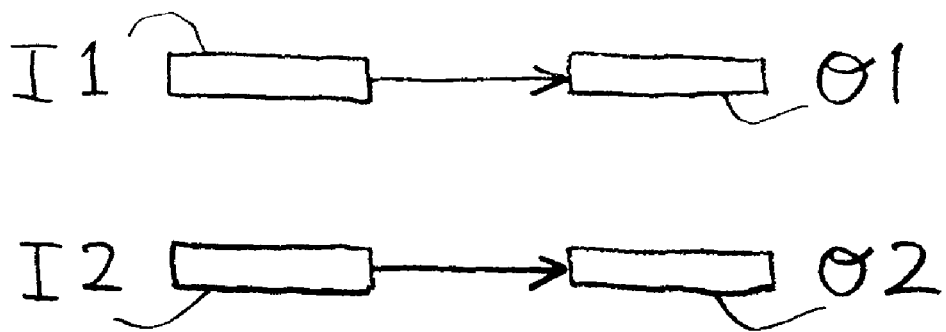
FIGS. 3 and 4 are schematic diagrams of a first state and a second state of the optical switch according to one embodiment of the present invention.
Figure 4:
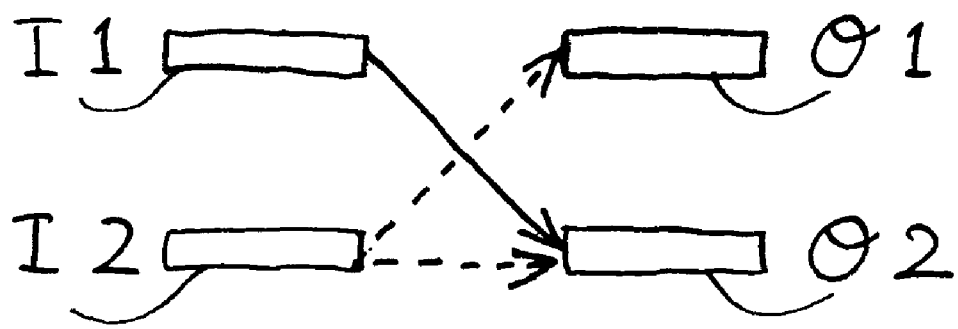

FIGS. 3 and 4 illustrate a first state and a second state of the optical switch 100 according to one embodiment of the present invention, respectively. In this embodiment, the optical switch illustrated in FIGS. 1 and 2 functions as a switch with two input terminals and two output terminals having the first and second states as respectively shown in FIGS. 3 and 4. This embodiment represented by FIGS. 3 and 4 is referred to as a blocking-type, 2-input/2-output switch, or a blocking 2×2 switch. Input optical fibers I1 and I2, and output optical fibers O1 and O2 in FIGS. 3 and 4 correspond to the input optical fibers 110 and 112, and output optical fibers 120 and 122 in FIGS. 1 and 2, respectively.

Figure 5:
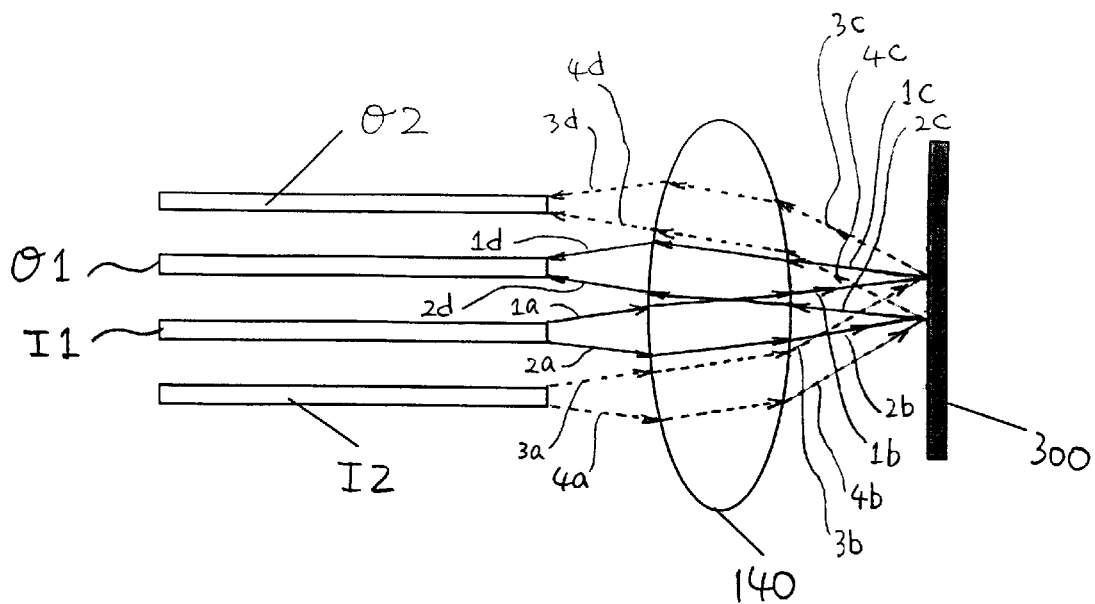
FIGS. 5 and 6 are schematic cross-section views of the optical switch according to the present invention.
Figure 6:
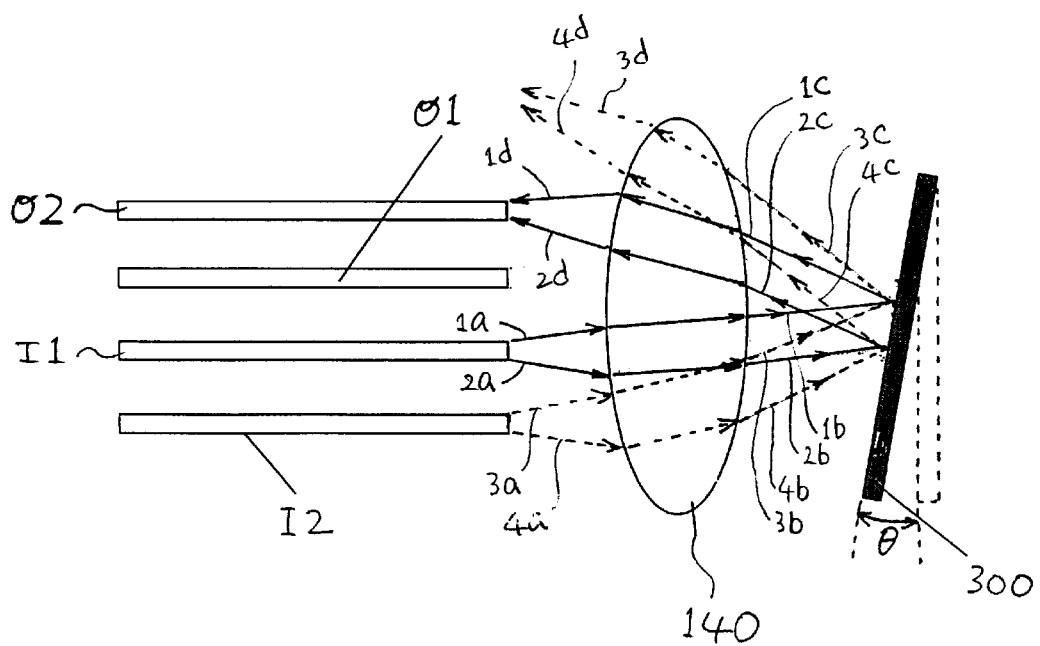

FIGS. 5 and 6 illustrate schematic cross-section views of the optical switch 100 according to the present invention, which show the light beam paths through which the light beam travels the input optical fibers I1 and I2, the output optical fibers O1 and O2, the lens 140, and the mirror 300. An actuator, which will be described referring to FIGS. 14–21, operative to move the mirror 300 determines a position of the mirror 300 relative to the input optical fibers I1 and I2, and output optical fibers O1 and O2. Depending on the position of the mirror 300, the switch 100 selectively maintains one of the first and second states shown in FIGS. 3 and 4, respectively. FIGS. 5 and 6 illustrate the first and second states shown in FIGS. 3 and 4, respectively.

In the first state of FIG. 3 where the mirror 300 is set to a first position shown in FIG. 5, the optical switch 100 provides a first combination of optical paths, i.e., paths I1-O1 and I2-O2, through which the light beam travels from the input optical fibers I1 and I2 to the output optical fibers O1 and O2. In the second state of FIG. 4 where the mirror 300 is set to a second position shown in FIG. 6, the optical switch 100 provides a second combination of optical paths, i.e., a path I1-O2 and the decoupled optical fibers I2 and O1.

For simplicity of the language, the term "optical path" is defined herein to include a set of the decoupled optical fibers I2 and O1 through which the light beam is not propagated actually. Thus, the "second combination of optical paths" for FIG. 4 includes an actually coupled path between the input optical fiber I1 and output optical fiber O2, and the decoupled optical fibers I2 and O1.

Referring to FIG. 5, the light beam path of the optical switch 100 in the first state of FIG. 3 will be described. The light beam transmitted from the input optical fiber I1 includes edge rays 1a and 2a, which bend through the lens 140 to become rays 1b and 2b, respectively. These rays reflect off the mirror 300 as rays 1c and 2c, respectively, and are then converged by the lens 300 to provide respective rays 1d and 2d, which are received by the output optical fiber O1.

Similarly, the light beam transmitted from the input optical fiber I2 includes edge rays 3a and 4a, which bend through the lens 140 to become rays 3b and 4b, respectively. These rays reflect off the mirror 300 as rays 3c and 4c, respectively, and are then converged by the lens 300 to provide respective rays 3d and 4d, which are received by the output optical fiber O2.

Thus, the light beams from the input optical fibers I1 and I2 reach the output optical fibers O1 and O2, respectively, substantially without loss.

Referring to FIG. 6, the light beam path of the optical switch 100 in the second state of FIG. 4 will be described. In the second state, the mirror 300 is slightly tilted by angle θ so that the input optical fiber I1 is coupled to the output optical fiber O2. The difference from the case of FIG. 5 is that the rays 1d and 2d are received by the output optical fiber O2, and that the rays 3d and 4d are not received by any optical fiber.

Thus, the light beam from the input optical fiber I1 reaches the output optical fiber O2 substantially without loss. However, the light beam from the input optical fiber I2 does not reach any optical fiber. Thus, the input optical fiber I2 is decoupled from the output optical fibers O1 and O2, and the input optical fiber I1.

Figure 7:
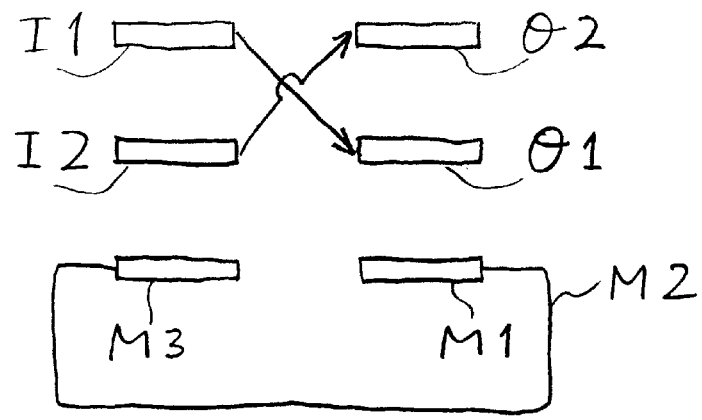
FIGS. 7 and 8 are schematic diagrams of a first state and a second state of the optical switch according to another embodiment of the present invention.
Figure 8:
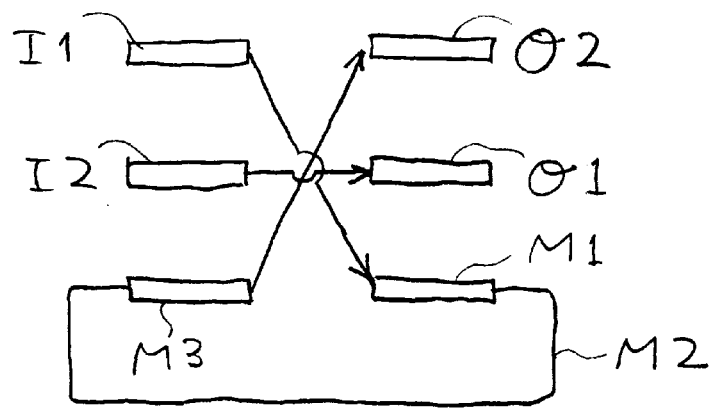

FIGS. 7 and 8 illustrate a first state and a second state of the optical switch 100 according to another embodiment of the present invention, respectively. In this embodiment, the optical switch illustrated in FIGS. 1 and 2 functions as a switch with two input terminals and two output terminals having the first and second states as respectively shown in FIGS. 7 and 8. This embodiment represented by FIGS. 7 and 8 is referred to as a non-blocking-type, 2-input/2-output switch, or a non-blocking 2×2 switch. Input optical fibers I1 and I2, and output optical fibers O1 and O2 in FIGS. 7 and 8 correspond to the input optical fibers 110 and 112, and output optical fibers 120 and 122 in FIGS. 1 and 2, respectively.

Figure 9:
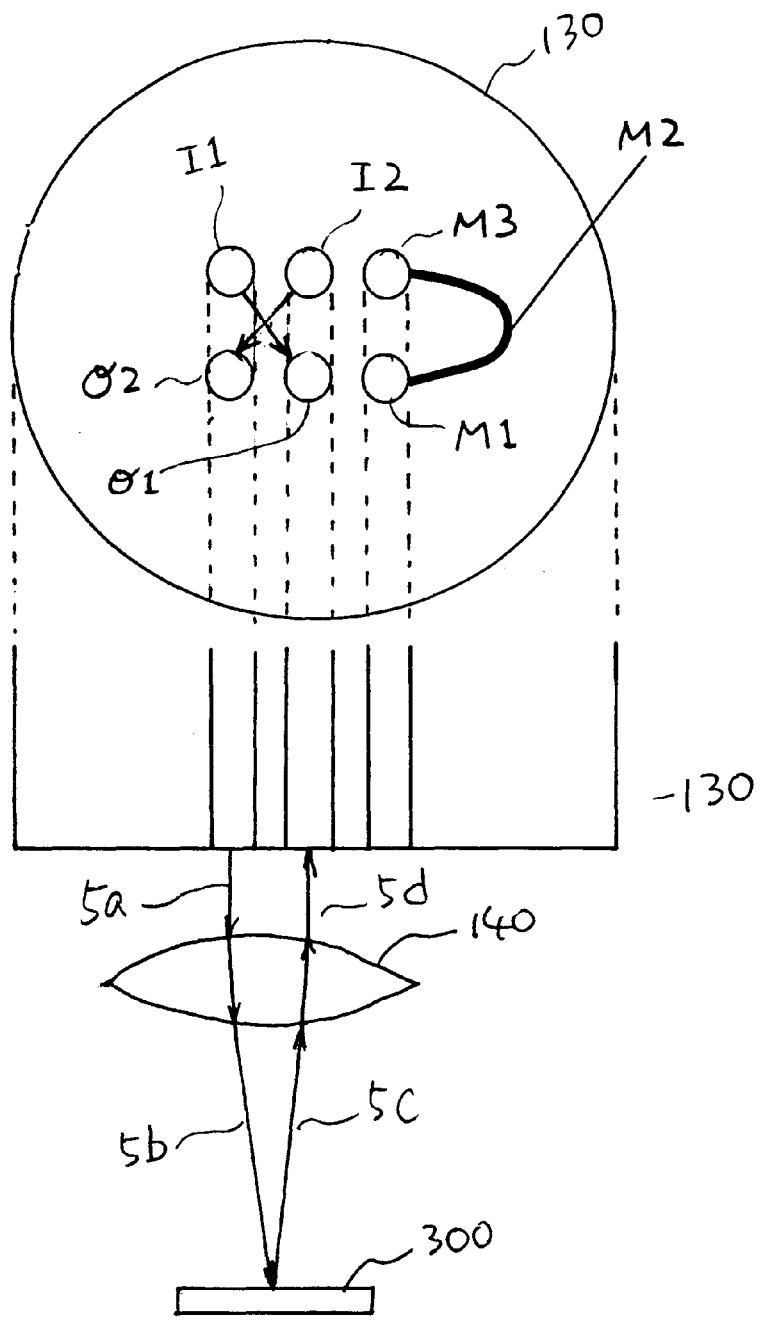
FIGS. 9 and 10 are schematic cross-section views and plan views of the optical switch according to the present invention.
Figure 10:
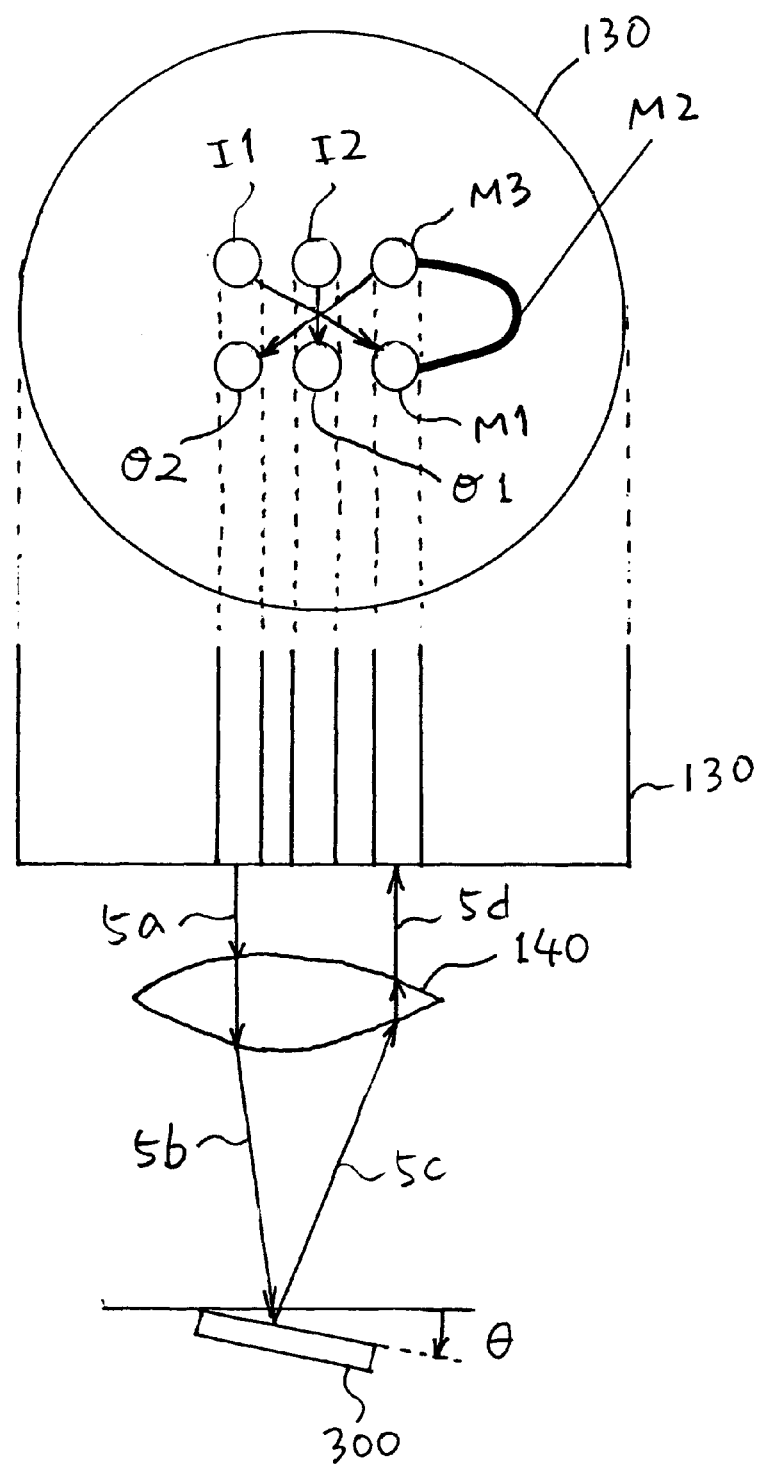

FIGS. 9 and 10 illustrate schematic cross-section views and plan views of the optical switch 100 according to the present invention, which show the light beam paths through which the light beam travels the input optical fibers I1 and I2, the output optical fibers O1 and O2, the lens 140, and the mirror 300. An actuator operative to move the mirror 300 determines a position of the mirror 300 relative to the input optical fibers I1 and I2, and output optical fibers O1 and O2. Depending on the position of the mirror 300, the switch 100 selectively maintains one of the first and second states shown in FIGS. 7 and 8, respectively. FIGS. 9 and 10 illustrate the first and second states shown in FIGS. 7 and 8, respectively.

In the first state of FIG. 7 where the mirror 300 is set to a first position shown in FIG. 9, the optical switch 100 provides a first combination of optical paths, i.e., a path I1-O1 and a path I2-O2, through which the light beam travels from the input optical fibers I1 and I2 to the output optical fibers O1 and O2. In the second state of FIG. 8 where the mirror 300 is set to a second position shown in FIG. 10, the optical switch 100 provides a second combination of optical paths, i.e., a path I1-O2 via M1-M2-M3 and a path I2-O1. Intermediate optical fibers M1, M2 and M3 are manufactured to have substantially the same optical characteristics as the input and output optical fibers I1, I2, O1 and O2. The "optical path" is defined herein to include a set of the intermediate optical fibers M1, M2 and M3.

Referring to FIG. 9, the light beam path of the optical switch 100 in the first state of FIG. 7 will be described. The light beam transmitted from the input optical fiber I1 is represented by a light beam 5a, which bend through the lens 140 to become a light beam 5b. This light beam reflects off the mirror 300 as light beam 5c, and is then converged by the lens 300 to provide light beam 5d, which is received by the output optical fiber O1. Similarly, the light beam transmitted from the input optical fiber I2 is received by the output optical fiber O2. Thus, the light beams from the input optical fibers I1 and I2 reach the output optical fibers O1 and O2, respectively, substantially without loss.

Referring to FIG. 10, the light beam path of the optical switch 100 in the second state of FIG. 8 will be described. In the second state, the mirror 300 is slightly tilted by angle θ so that the input optical fiber I1 is coupled to the output optical fiber O2 via the intermediate optical fibers M1, M2 and M3, and the input optical fiber I2 is coupled to the output optical fiber O1. Thus, the light beam from the input optical fibers I1 and I2 reach the output optical fibers O1 and O2, respectively, substantially without loss.

The optical switch 100 according to the present invention has two input optical fibers and two output optical fibers. However, the number of the input optical fibers and the output optical fibers may be more than two. For example, the embodiments of the present invention include an optical switch which has one input optical fiber and two optical fibers, where an input light beam is selectively outputted to one of the two output optical fibers.

Figure 11:
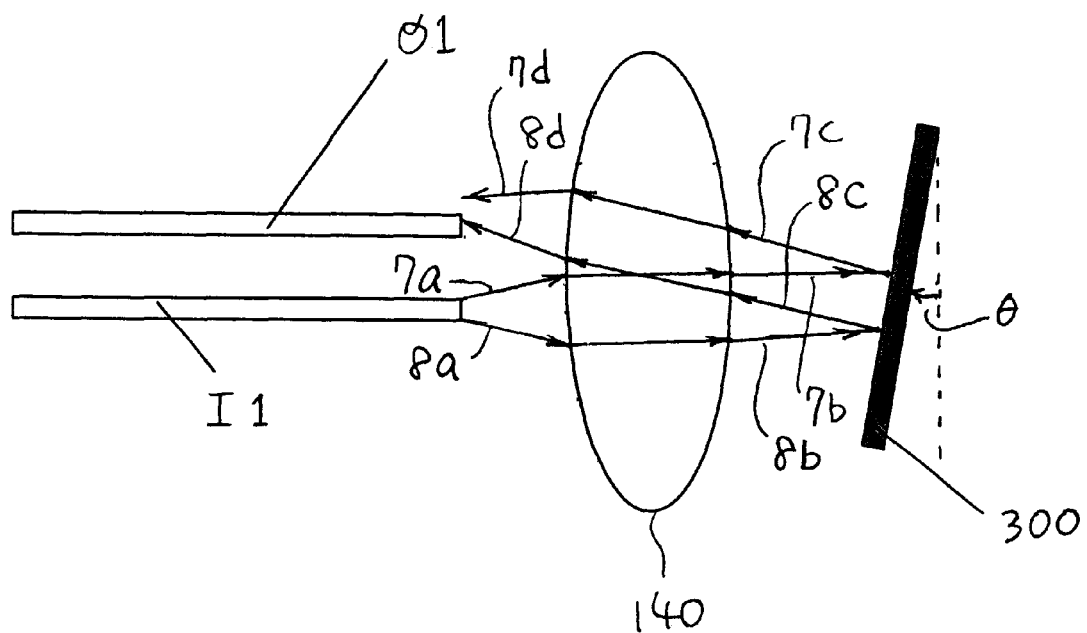
FIG. 11 is a schematic cross-section view of an optical attenuator 102 according to the present invention.

FIG. 11 illustrates a schematic cross-section view of an optical attenuator 102 according to the present invention, which shows the light beam paths through which the light beam travels the input optical fiber I1, the output optical fiber O1, the lens 140, and the mirror 300. The overall configuration of other elements is the same as described referring to FIG. 1. An actuator operative to move the mirror 300 determines a position of the mirror 300 relative to the input and output optical fibers I1 and O1. Depending on the position of the mirror 300, the optical attenuator 102 varies the loss between the input optical fiber I1 and output optical fiber O1.

Specifically, referring to FIG. 11, the light beam path of the optical attenuator 102 will be described. The light beam transmitted from the input optical fiber I1 includes edge rays 7a and 8a, which bend through the lens 140 to become rays 7b and 8b, respectively. These rays reflect off the mirror 300 as rays 7c and 8c, respectively, and are then converged by the lens 300 to provide respective rays 7d and 8d. The edge ray 7d is not received by the output optical fiber O1 while the edge ray 8d is received by the output optical fiber O1. Thus, the loss between the input optical fiber I1 and the output optical fiber O1 varies in accordance with the amount of the light beam which is received at the end of the output optical fiber O1. This amount is controlled by the tilt angle θ of the mirror 300.

The optical attenuator 102 according to the present invention has at least two positions corresponding to at least two values of loss between the input optical fiber and the output optical fiber. However, the optical attenuator 102 may have positions more than two corresponding to values of the loss more than two. Furthermore, the optical attenuator 102 may continuously vary the loss between the input fiber and the output fiber.

Figure 12:
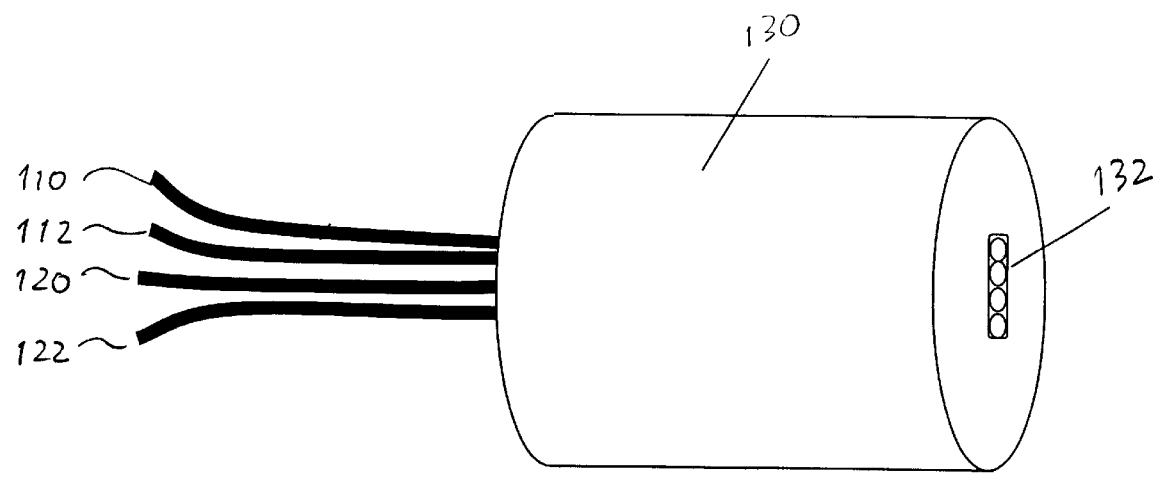
FIGS. 12 and 13 are the arrangements where the input and output optical fibers are supported by the ferrule.
Figure 13:
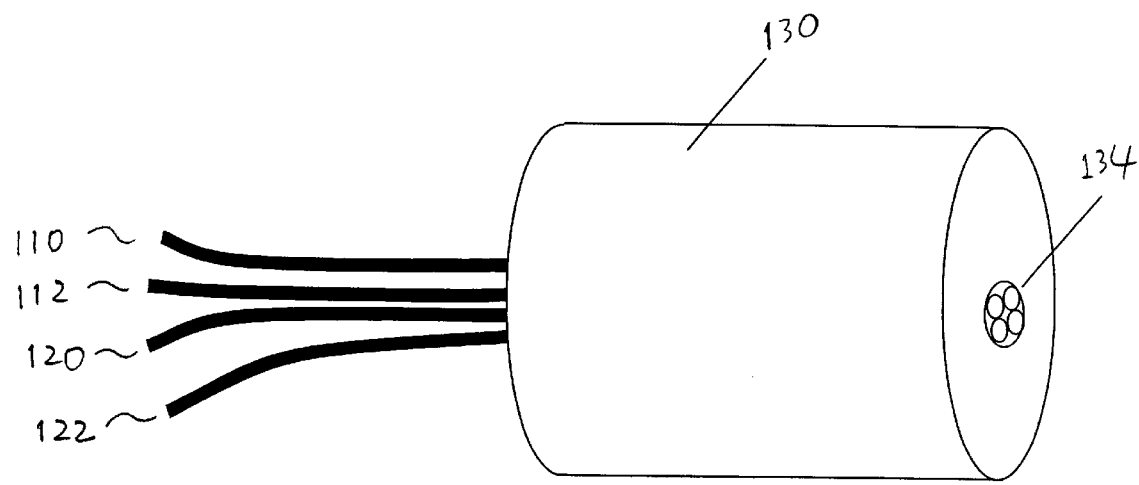

FIGS. 12 and 13 illustrate the arrangements where the input and output optical fibers 110, 112, 120 and 122 are supported by the ferrule 130. In FIG. 12, the ends of the input and output fibers 110, 112, 120 and 122 are arranged in a straight line by the ferrule 130 which has an oblong slot 132. Alternatively, the ferrule 130 has a series of V-shaped grooves to hold the optical fibers. In FIG. 13, the ends of the input and output fibers 110, 112, 120 and 122 are arranged in a circle by the ferrule 130 having a hole 134 which is just large enough to accommodate the packed optical fibers and support them tightly.

The structure of the mirror chip 200 will be described in detail below. Although the mirror 300 can be fabricated from any number of materials, the mirror 300 is preferably manufactured from single crystal silicon since the mechanical and electrical properties of silicon are well known, and thus, there is a well-established technology for batch manufacturing silicon devices.

Figure 14:
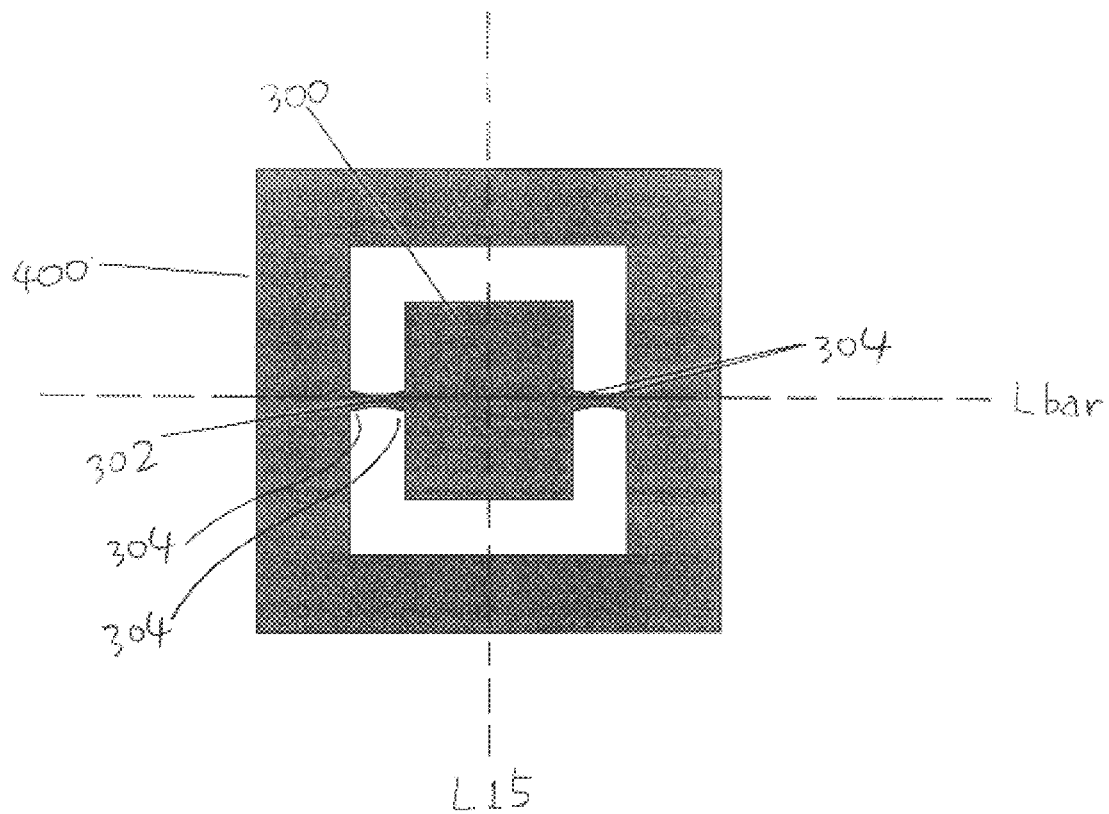
FIG. 14 is a plan view of the structure of the mirror chip according to the present invention.
Figure 15:
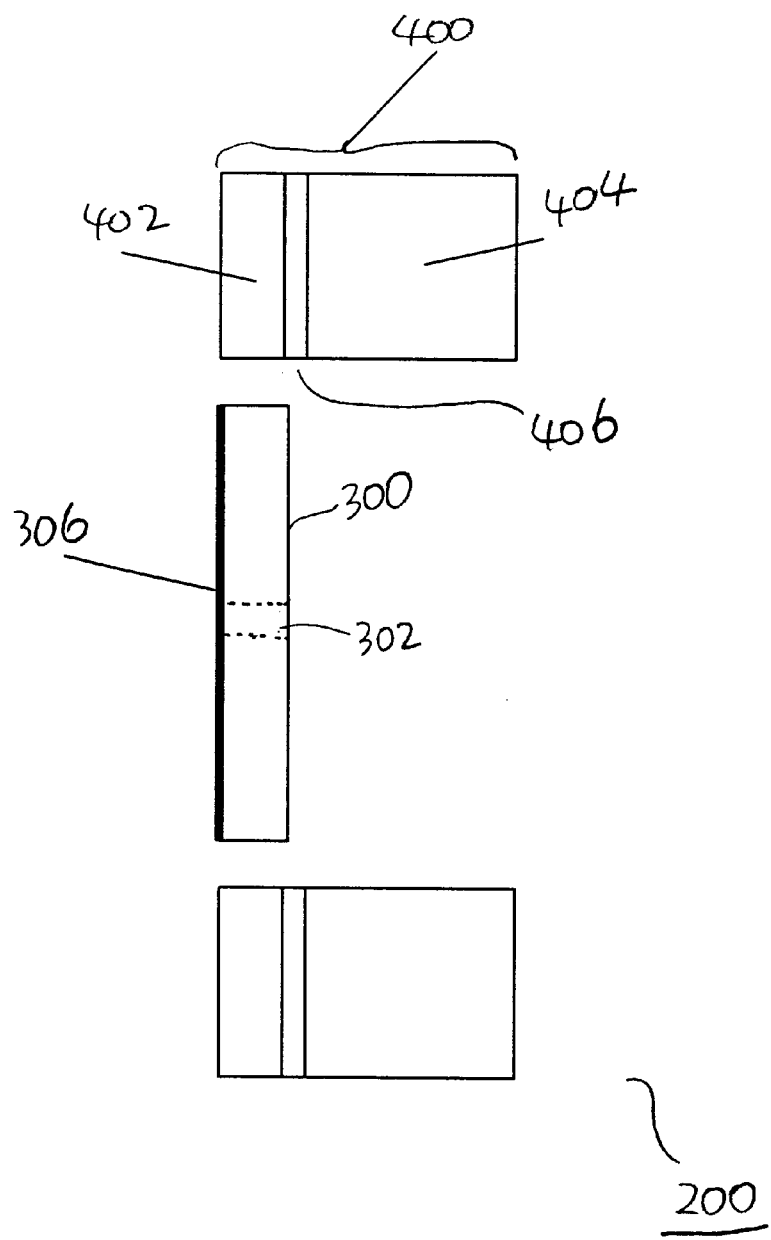
FIG. 15 is a cross-sectional view of the structure of the mirror chip cut along by the line L15 in FIG. 14.

Now, referring to FIGS. 14–21, a structure of an actuator for moving the mirror 300 according to the present invention will be described in detail. FIG. 14 illustrates a plan view of the structure of the mirror chip 200 according to the present invention, and FIG. 15 illustrates a cross-sectional view of the structure of the mirror chip 200 cut along by the line L15 in FIG. 14. Supporting hinges 302 which movably support the mirror 300 functioning as a spring are fabricated on the wafer 400 by utilizing photolithography, and either wet chemical or plasma etching process. The thickness of the mirror 300 and hinges 302 is controlled by etching the silicon, or preferably, by using SOI (silicon-on-insulator) wafers.

Referring to FIG. 14, hinges 302 functioning as springs connect the mirror 300 to the wafer 400 from which the wafer 400 was made. The hinges 302 are preferably made of the same silicon wafer 400 as the mirror 300. Typically, the hinges 302 are torsion bars that permit the mirror 300 to rotate about an axis of the torsion bars Lbar. The torsion bars are made significantly thicker than the width of the torsion bars so that the bars are more compliant in torsion than they are in other modes of bending. The hinges functioning as torsion bars can be stiffened in non-rotation modes of bending by adding fillets 304 at the two ends of each of the hinges 302.

Referring to FIG. 15, the wafer 400 preferably includes a silicon wafer, further preferably includes an SOI wafer, which includes silicon layers 402 and 404 separated by a silicon dioxide layer 406. The SOI wafers are manufactured or purchased with precisely controlled layer thickness. Moreover, available wet chemical and plasma etching techniques are preferably used to etch either silicon or silicon dioxide preferentially to the other material. Thus, the mirror 300 is fabricated with well-controlled thickness.

The mirror 300 is coated with a metal layer 306, such as gold, to increase its reflectivity. Alternatively, the reflectivity of the mirror 300 is improved by coating the mirror 300 with multiple layers of dielectric films.

Figure 16:
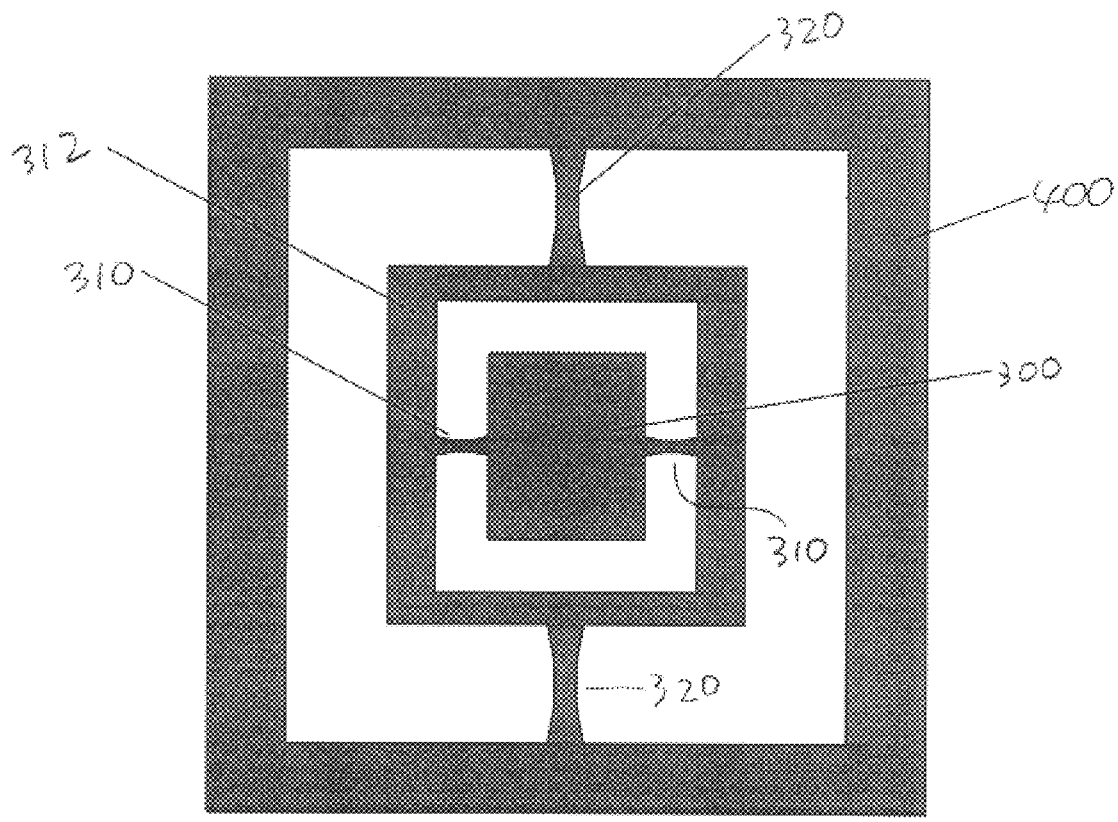
FIG. 16 is an alternate suspension mechanism of the mirror according to the present invention.

FIG. 16 illustrates alternate suspension mechanisms of the mirror 300 according to the present invention. The suspension system of FIG. 16 is utilized in order to permit the mirror 300 to rotate in two degrees of freedom. One such mechanism is a gimbal mechanism whereby the mirror 300 is connected via torsion bars 310 to a frame 312 which is, in turn, connected to the rest of the wafer 400 by additional torsion bars 320 which are situated at an angle to the torsion bars 310. The angle of the torsion bars 310 and 320 is preferably about 90 degrees.

Figure 17:
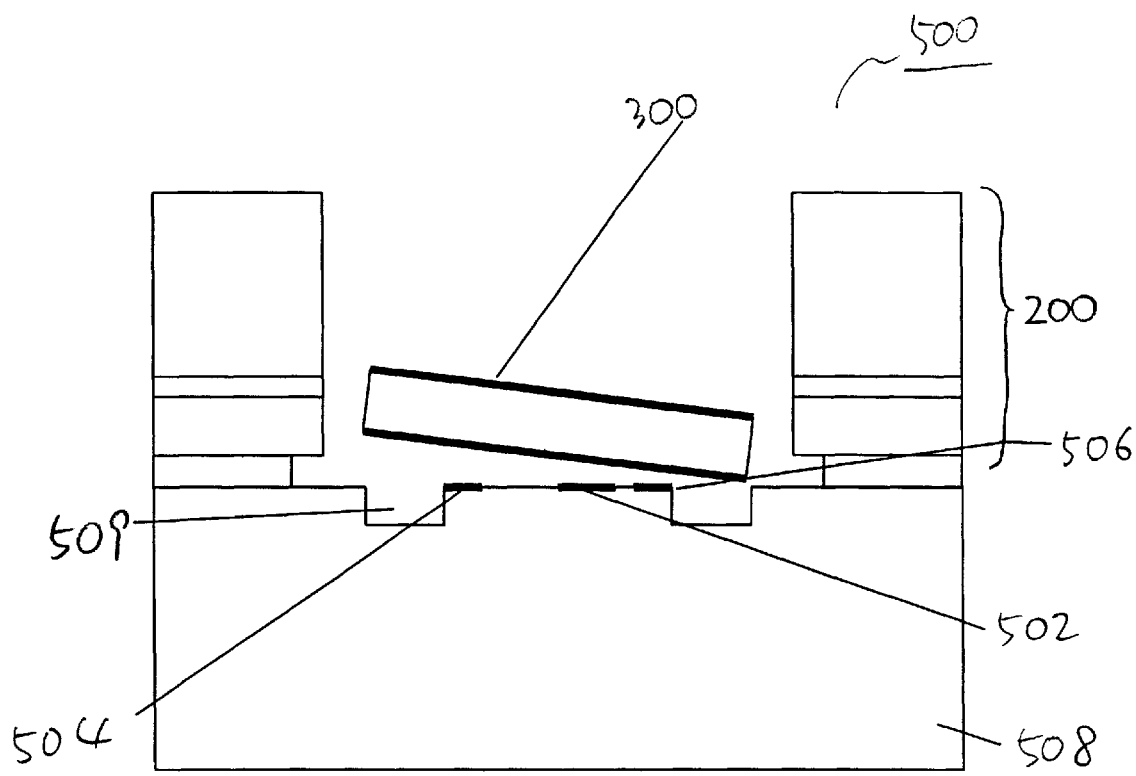
FIGS. 17 and 18 are cross-sectional views of the structure of the actuator for the mirror according to the present invention.
Figure 18:
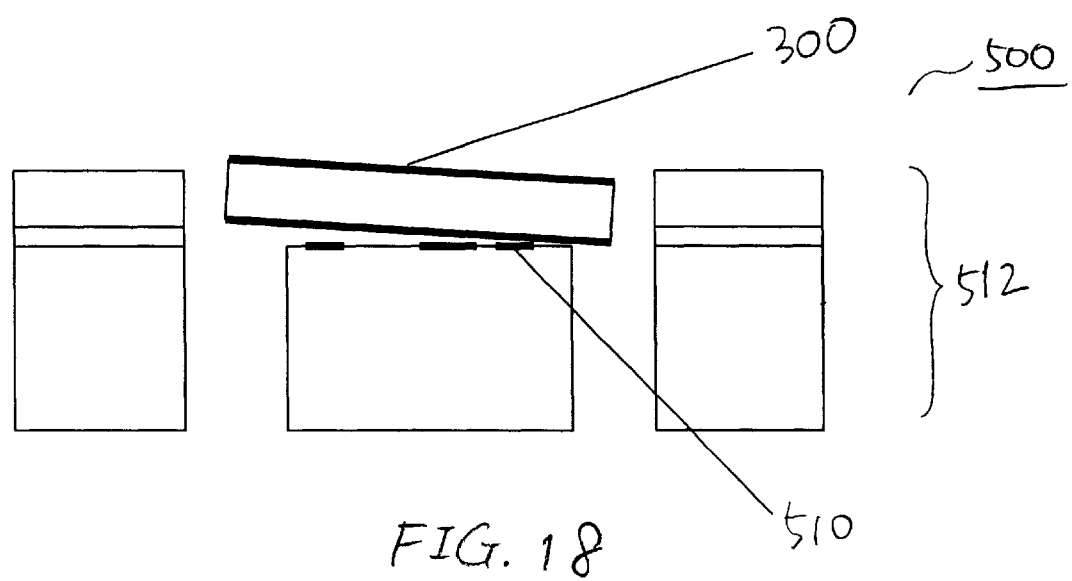

FIGS. 17 and 18 illustrate cross-sectional views of the structure of the actuator 500 for the mirror 300 according to the present invention. The mirror 300 is tilted between its rest position and one or more switched positions by applying an electric field between the mirror 300 and one or more driving electrode 502. The driving electrode 502 and the mirror 300 form a parallel plate electrostatic actuator. The driving electrode 502 is preferably metal traces on an electrode chip 508 fabricated from glass or silicon which is bonded to the mirror chip 200. Alternatively, driving electrodes 510 in FIG. 18 are fabricated from the same SOI wafer 512 which is used to make the mirror 300. The mirror 300, and the actuator 500 which moves the mirror 300 are preferably provided on a silicon wafer.

The size and shape of the electrode 502 are designed to ensure that the mirror 300 operates in a stable mode over the desired range of motion, regardless of the voltage applied to the electrode 502. If the electrode 502 is made larger than a critical value, then the mirror can "snap down" to the electrode when the mirror-to-electrode voltage is too large.

The tilted position of the mirror 300 can be set in one of the following three ways. First the position can be determined by mechanical structures 506 on the mirror 300 and/or the electrode chip 508 that limit the amount that the mirror 300 tilts. The second method is to control the voltage that is applied to the drive electrode 502. Whenever the same voltage is applied to the electrode 502, the mirror 300 tilts by the same angle. The third method is to use feedback control. In this case, the angular position of the mirror 300 is measured. The difference between the measured position and desired position is used to control the voltage applied to the drive electrode 502 in such a manner to ensure that the mirror 300 is kept in the desired position. The position of the mirror 300 can be determined by measuring the capacitance between the mirror 300 and the driving electrode 502, or electrodes 504 which are provided for this measuring purpose.

Referring to FIG. 17, the actuator 500 preferably includes trenches 509 to increase the range of possible mirror rotation, to provide a mechanical stop that limits the range of rotation, and to control the squeeze film damping of the mirror 300. The mirror 300 and the torsion spring form a two-pole mechanical system. Two-pole systems will settle fastest if they are critically damped. The size, location, and pattern of trenches in the electrode wafer are designed to ensure that the mirror 300 is close to critical damping so that the optical switch 100 can switch states in the least possible time.

Figure 19:
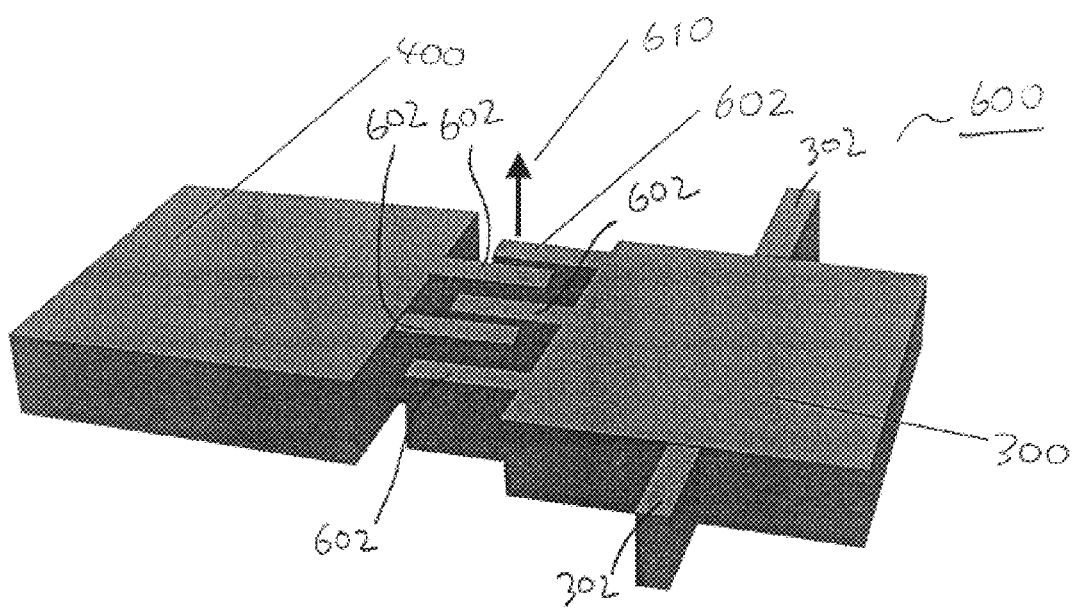
FIGS. 19 and 20 are diagrams showing the structure of a vertical comb drive actuator according to the present invention.
Figure 20:
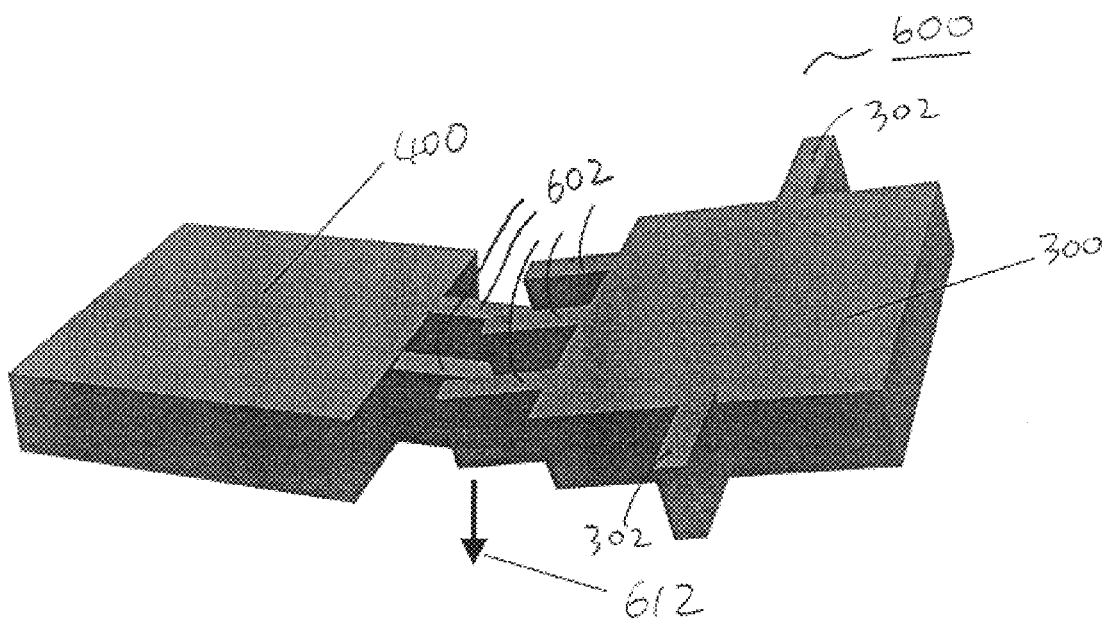

FIGS. 19 and 20 illustrate the structure of a vertical comb drive actuator 600. The vertical comb drive actuator 600 is an alternative actuator that can be used in lieu of or in conjunction with the parallel plate actuator described referring to FIGS. 14–18. The vertical comb driver 600 is fabricated by forming a series of interdigitated fingers 602 on the periphery of the mirror 300 and the adjacent portion of the wafer 400. When a voltage is applied between the two sets of fingers 602, the electrostatic force 610 on the mirror 300 will rotate the mirror 300 in the direction that maximizes the capacitance between the fingers 602. If the two sets of fingers 602 are fabricated from the same layer of silicon, the electrostatic force 610 will push the mirror into its as-fabricated position as shown in FIG. 19. If the fingers 602 are fabricated such that the fingers 602 are not coplanar, the electrostatic force 612 will cause the mirror 300 to rotate out of its as-fabricated orientation as shown in FIG. 20. Preferably, the electrostatic forces 610 and 612 are normal to a plane of the silicon wafer 400.

The sensitivity of the position-sensing electrode can be made larger by placing interdigitated electrodes 602 on the edge of the mirror 300 and on the surrounding portion of the wafer 400. These electrodes will form a capacitor whose capacitance will decrease as the mirror 300 rotates out of plane in which the mirror 300 is originally located when the mirror 300 is not actuated.

Figure 21:
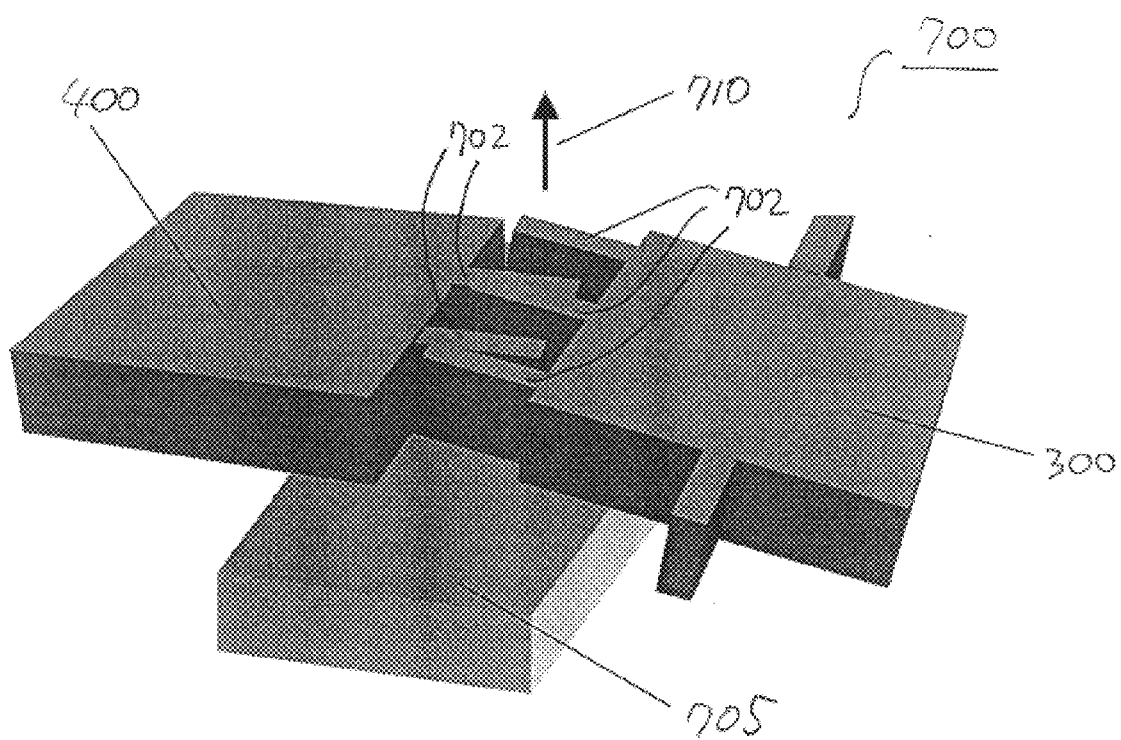
FIG. 21 is a diagram showing the structure of a levitation force comb actuator according to the present invention.

FIG. 21 illustrates the structure of a levitation force comb actuator 700. The levitation force actuator 700 includes interdigitated fingers 702 on the peripheral portion of the mirror 300, the portion of the wafer 400 adjacent to the mirror 300, and an electrode 705 beneath the both sets of fingers 702. The electrode 705 causes an asymmetry in the electric field between the fingers 702 and the electrode 705 which generates a force 710 normal to and away from the electrode 705.

While the invention has been described above by reference to various embodiments, it will be understood that changes and modifications may be made without departing from the scope of the invention which is to be limited only by the appended claims and their equivalents.

What is claimed is:

1. An optical device comprising:
   a first set of one or more input optical fibers which supplies at least one light beam;
   a second set of one or more output optical fibers which receives said light beam;
   a lens which focuses said light beam;
   a movable mirror which reflects said light beam from said first set onto said second set of output optical fibers; and
   an actuator operative to move said mirror to a first position in a first combination of optical paths, through which said light beam travels from said first set to said second set, and to a second position in a second combination of optical paths, though which said light beam travels from said first set to said second set, wherein said first combination is different from said second combination, and a total number of optical fibers in said first and second sets is more than two, said mirror and said actuator provided on a silicon wafer and said actuator comprising a plurality of interdigitated fingers, wherein said actuator moves said mirror by electrostatic force in a direction normal to a plane of said silicon wafer.

2. The optical device of claim 1, further comprising a ferrule which supports said first set and said second set;
   a package encasing said mirror and said actuator; and
   a window which is made of transparent material and provided on said package;
   wherein said lens is a gradient index lens, and is sandwiched by said ferrule and said window.

3. The optical device of claim 1, wherein said second set comprises at least two optical fibers.

4. The optical device of claim 1, wherein loss between said first set and said second set when said mirror is in a first position is different from loss between said first set and said second set when said mirror is in a second position.

5. The optical device of claim 1, wherein said first set has a first input optical fiber and a second input optical fiber, and said second set has a first output optical fiber and a second output optical fiber, and wherein
   said first combination includes a first optical path between said first input optical fiber and said first output optical fiber, and a second optical path between said second input optical fiber and said second output optical fiber, and
   said second combination includes a third optical path between said first input optical fiber and said second output optical fiber, and said second input optical fiber is decoupled from said first and second output optical fibers.

6. The optical device of claim 1, wherein said first set has a first input optical fiber and a second input optical fiber, and said second set has a first output optical fiber and a second output optical fiber; and wherein
   said first combination includes a first optical path between said first input optical fiber and said first output optical fiber, and a second optical path between said second input optical fiber and said second output optical fiber, and
   said second combination includes a third optical path between said first input optical fiber and said second output optical fiber, and a fourth optical path between said second input optical fiber and said fist output optical fiber.

7. The optical device of claim 1, further comprising a ferrule which supports said first set and said second set.

8. The optical device of claim 7, further comprising a package encasing said mirror and said actuator.

9. The optical device of claims 8, said package has a window which is made of transparent material.

10. The optical device of claim 9, said lens is a gradient index lens, is connected to said ferrule, and is attached to said window.

11. The optical device of claim 1, wherein said moveable mirror pivots about an axis, and wherein said light beam has a path, the axis located in the path.

12. The optical device of claim 11 wherein said movable mirror reflects said light beam by pivoting about the axis in the path of said light beam.

13. An optical device comprising:
   a first set of one or more input optical fibers which sends a light beam;
   a send set of one or more output optical fibers which receives said light beam;
   a lens which focuses said light beam;
   a mirror within the path of said light beam, wherein said mirror pivots to change its angle in reflecting said light beam from said first set onto said second set of output optical fibers; and
   an actuator operative to pivot said mirror to a first position, causing said light beam to travel from said first set to said second set, and to a second position, causing said light beam to travel from said first set to said second set, wherein the actuator comprises a micro-electro-mechanical actuator having interdigital fingers, the mirror comprises a reflective surface, and a voltage applied to the interdigital fingers creates a force normal to the reflective surface.

14. The optical device of claim 13 wherein the mirror pivots about a torsional spring.

15. The optical device of claim 13 wherein the actuator comprises a parallel plate capacitive structure.

16. The optical device of claim 15 wherein the parallel plate capacitive structure comprises driving electrodes used to position the mirror.

17. The optical device of claim 13 wherein the mirror pivots about an axis substantially normal to said optical fibers.

* * * * *